United States Patent Office 3,125,581
Patented Mar. 17, 1964

3,125,581
2,3 AND 2,3,4, PERFLUORO CARBON SUBSTITUTED PERFLUORO OXETANES
Donald Drake Coffman, West Chester, Pa., and John Ferguson Harris, Jr., Wilmington, Del., assignors to E. I. du Pont de Nemours and Company, Wilmington, Del., a corporation of Delaware
No Drawing. Filed Oct. 10, 1958, Ser. No. 766,390
12 Claims. (Cl. 260—333)

This invention relates to a new class of cyclic ethers and more particularly to a new class of polyfluorocyclic ethers.

Cyclic ethers as a class are well recognized in the art as useful reactants and polymer intermediates and as solvents and plasticizers. Generally such ethers have been limited in their usefulness because of relatively low physical and chemical stability. Recently—see U.S. Patent 2,594,272, issued to E. A. Kauck and J. H. Simons on April 29, 1952—the perfluoromonocyclic ethers of from three to five ring carbons have been prepared and have been found to exhibit a high degree of chemical inertness. While these ethers are of interest because of this stability, they are of only limited usefulness in view of the undesirably low boiling points. Thus, the four-membered ring perfluorooxetane is normally a gas, boiling at about −38° C. Perfluorooxolane is likewise a gas having a normal boiling point of about 1° C. and finally, even the six-membered ring perfluorinated cyclic ether, perfluorooxane, is a volatile liquid, having a normal boiling point of about 32° C.

Recently—see the copending U.S. patent applications of Harris Serial Nos. 675,020 and 666,760, filed July 30 and June 19, 1957, now Patents 2,995,572 and 2,995,571, respectively—somewhat higher boiling 2-hydro- and 2,2-bis(omega - acidogenic halocarbyl) - polyfluorooxetanes have been prepared. However, these two types of polyfluorooxetanes are primarily of interest because, while exhibiting a fundamentally stable chemical configuration, they still possess reactive chemical sites which permit the chemical modification thereof. In the former compounds, the reactive chemical site is the ring hydrogen, and in the latter, the omega-acidogenic halogen substituent on the two 2-substituents.

A new class of polyfluorooxetanes has now been discovered which exhibits both higher boiling points and high chemical stability. These new compounds can be more fully described as 3,4-difluoro-2,3-bis(perfluoro- or omega-hydroperfluorocarbyl)oxetanes in which the single remaining valence on each of the 2- and 4-carbons is satisfied by fluorine or perfluoro- or omega-hydroperfluorocarbyl radicals. These new polyfluorooxetanes can thus be represented as compounds having the skeletal structure:

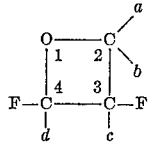

The indicated valences $a$ and $b$ are satisfied by either (I) two monovalent radicals Z, or (II) one fluorine atom and one monovalent radical Z, or (III) a divalent perfluorocarbyl radical forming with the carbon to which attached a carbocyclic ring of 4 to 7 carbon atoms, inclusive. The indicated valences $c$ and $d$ are satisfied by either (IV) two monovalent radicals Z, or (V) one fluorine atom and one monovalent radical Z, with the proviso that the fluorine atom satisfies valence $d$, or (VI) a divalent perfluorocarbyl radical forming with the carbon atoms to which is attached a carbocyclic ring of 4 to 7 carbon atoms, inclusive. The symbol "Z" as used herein represents a perfluorocarbyl or an omega-hydroperfluorocarbyl radical. The Z radicals may be alike or different where two or more are present in the molecule. These new polyfluorooxetanes can be readily prepared by the actinic light-activated cycloaddition reaction between the requisite polyfluoroolefin and polyfluoroacyl fluoride or polyfluoroketone in accordance with the following equation in which the $a$, $b$, $c$, and $d$ valences are satisfied as previously indicated:

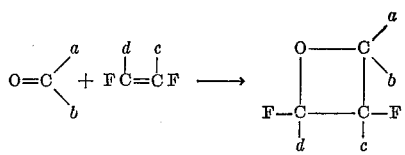

The following examples in which the parts given are by weight are submitted to further illustrate but not to limit the process and products of the present invention.

EXAMPLE I

A mixture of 38.7 parts of perfluorobutyryl fluoride and 90 parts (3.3 molar proportions based on the acyl fluoride) of hexafluoropropene in a cylindrical quartz reactor approximately four diameters long, maintained at atmospheric pressure and under reflux from a solid carbon dioxide/acetone-cooled condenser, was exposed for a period of fifteen days to the UV light from a low-pressure, 10-watt, quartz, mercury "resonance" lamp fitted in a spiral around the reactor. The resulting reaction mixture was separated by precision fractionation through a spinning band distillation column—U.S. Patent 2,712,520, issued to R. G. Nester on July 5, 1955. There was thus obtained 42.8 parts (65% of theory) of 3-perfluoromethyl-2-perfluoropropylperfluorooxetane, i.e., 2,3,4,4-tetrafluoro - 3 - trifluoromethyl - 2 - perfluoropropyloxetane, as a clear, colorless liquid boiling at 74–78° C. at atmospheric pressure.

*Analysis.*—Calcd. for $C_7F_{14}O$: C, 23.0%; F, 72.6%. Found: C, 22.9%; F, 73.5%.

The infrared spectrum showed no absorption indicative of the carbonyl group. A vapor phase chromatogram in the manner of Evans et al., J. Chem. Soc., 1955, 1184, showed two peaks. Small samples of each constituent were isolated through vapor phase chromatography. The nuclear magnetic resonance spectra of these fractions were consistent with the geometric cis and trans isomers.

EXAMPLE II

A mixture of 40 parts of perfluorooctanoyl fluoride and 50 parts (3.4 molar proportions based on the acyl fluoride) of hexafluoropropene was irradiated under the conditions described in Example I for a period of 13 days. Upon fractionation as before there was obtained 49.9 parts (91% of theory) of 2-perfluoroheptyl-3-perfluoromethylperfluorooxetane, i.e., 2,3,4,4-tetrafluoro-2-perfluoroheptyl-3-trifluoromethyloxetane, as a clear, colorless liquid boiling at 162–166° C. at atmospheric pressure.

*Analysis.*—Calcd. for $C_{11}F_{22}O$: C, 23.3%; F, 73.8%. Found: C, 23.8%; F, 72.5%.

EXAMPLE III

A mixture of 25.1 parts of omega-hydroperfluorovaleryl fluoride and 30 parts (2.0 molar proportions based on the acyl fluoride) of hexafluoropropene was irradiated under the conditions described in Example I for a period of six days. Upon fractionation as before, there was obtained 19.2 parts (48% of theory) of 2-(omega-hydroperfluorobutyl) - 3 - perfluoromethylperfluorooxetane, i.e., 2-(4H-octafluorobutyl)-2,3,4,4-tetrafluoro-3-trifluoromethyloxetane, as a clear, colorless liquid boiling at 111–118.5° C. (mostly at 114° C.) at atmospheric pressure.

*Analysis.*—Calcd. for $C_8HF_{15}O$: C, 24.2%; H, 0.3%; F, 71.5%. Found: C, 24.6%; H, 0.5%; F, 72.2%.

A vapor phase chromatogram indicated the presence of two materials, presumably the geometric cis and trans isomers.

EXAMPLE IV

A mixture of 45 parts of perfluoro-4-heptanone and 45 parts (1.05 molar proportions based on the ketone) of perfluoro-1-heptene was irradiated under the conditions described in Example I for a period of 12 days. Upon fractionation as before, there was obtained 31% of recovered starting materials and 20.1 parts (32% of theory) of 3 - perfluoropentyl-2,2-bis-(perfluoropropyl)perfluorooxetane, i.e., 3,4,4-trifluoro-3-perfluoropentyl-2,2-bis(perfluoropropyl)oxetane, as a clear, colorless liquid boiling at 183–185° C. at atmospheric pressure.

*Analysis.*—Calcd. for $C_{15}F_{28}O$: C, 24.7%; F, 73.1%. Found: C, 24.0% F, 74.7%.

EXAMPLE V

A mixture of 48 parts of perfluoro-4-heptanone and 40 parts (2.0 molar proportions based on the ketone) of perfluoropropene was irradiated under the conditions described in Example I for a period of 8 days. Upon fractionation as before, there was obtained 42% of recovered ketone and 24.3 parts (62% of theory) of 3-perfluoromethyl-2,2-bis(perfluoropropyl)perfluorooxetane, i.e., 3,4,4-trifluoro-3-trifluoromethyl - 2,2 - bis(perfluoropropyl) oxetane, as a clear, colorless liquid boiling at 127–136° C. at atmospheric pressure.

*Analysis.*—Calcd. for $C_{10}F_{20}O$: C, 23.3%; F, 73.6%. Found: C, 24.0%; F, 72.2%.

EXAMPLE VI

A mixture of 17 parts of perfluorocyclobutanone and 35 parts (2.44 molar proportions based on the ketone) of perfluoropropene was irradiated under the conditions described in Example I for a period of eight days. Upon fractionation as before, there was obtained 10.2 parts of 3-perfluoromethyl-1 - oxaspiro[3.3]perfluoroheptane, i.e., 2,2,3,5,5,6,6,7,7 - nonafluoro - 3 - trifluoromethyl - 1 - oxaspiro[3.3]heptane, as a clear, colorless liquid boiling at 68–69° C. at atmospheric pressure.

*Analysis.*—Calcd. for $C_7F_{12}O$: C, 25.6% F, 69.5%. Found: C, 26.0%; F, 69.7%.

EXAMPLE VII

A mixture of 20 parts of perfluoro-n-butyryl fluoride and 20 parts (1.2 molar proportions based on the acid fluoride) of 4-hydroperfluoro-1-butene, i.e., 4H-octafluoro-1-butene, was irradiated under the conditions described in Example I for a period of four days. Upon fractional distillation of the reaction mixture as before, there was obtained 13.0 parts (35% of theory) of a mixture of the cis and trans isomers of 3-(2H-tetrafluoroethyl)-2,3,4,4-tetrafluoro-2 - perfluoropropyloxetane, i.e. 3-(beta-hydroperfluoroethyl)-2 - perfluoropropylperfluorooxetane as a clear, colorless liquid boiling at 109–115° C. at atmospheric pressure.

*Analysis.*—Calcd. for $C_8H_{15}O$: C, 24.2% H, 0.3%; F, 71.5%. Found: C, 24.4%; H, 0.7%; F, 71.4%.

The present invention is generic to 4-membered cyclic ethers carrying a fluorine substituent on each of the 3 and 4 carbon atoms and perfluorocarbyl or omega-hydroperfluorocarbyl on each of the 2 and 3 carbon atoms, with the remaining valences on the ring carbons being satisfied by fluorine, perfluorocarbyl or omega-hydroperfluorocarbyl. The preferred polyfluorooxetanes of the present invention, because of readier availability of the necessary intermediates, are the 3,4,4-trifluorooxetanes, wherein the 3-carbon carries a monovalent perfluorocarbyl or omega-hydroperfluorocarbyl radical, and the 2-carbon carries either (I) one fluorine atom and one monovalent radical Z or (II) two monovalent radicals Z, or (III) a divalent perfluorocarbyl radical, wherein any Z radicals are of no more than ten and more preferably no more than eight chain carbons each.

The present invention is also generic to the preparation of these new polyfluorooxetanes in the presence of actinic light from polyfluoroolefins and polyfluoroacyl fluorides or polyfluoroketones. More specifically, the invention is generic to the preparation of these 2- and 3-bis-(perfluoro- and omega-hydroperfluorocarbyl)-3,4-difluorooxetanes from perfluoroacyl and omega-hydroperfluoroacyl fluorides and perfluoro- and omega-hydroperfluoroketones with polyfluoroolefins of at least three chain carbons wherein the 1- and 2-carbons each carry at least one fluorine and the 3-carbon carries two fluorine substituents. In the most preferred embodiment because of generally readier availability of the necessary intermediates, the invention is generic to the preparation of polyfluorooxetanes by the reaction in the presence of actinic light of perfluoro- and omega-hydroperfluorocarbyl-1-olefins of at least three chain carbons, and generally of no more than twelve chain carbons, with perfluoroacyl fluorides and omega-hydroperfluoroacyl fluorides also generally of no more than twelve chain carbons, and acyclic omega-hydroperfluoro- and perfluorocarbyl ketones, again generally of no more than twelve chain carbons in each radical pendent on ketone carbonyl, as well as cyclic perfluorocarbyl ketones of from four to six ring carbons.

In the polyfluorooxetanes, the oxygen of the ketone or acyl fluoride reactant, i.e., in both instances the carbonyl oxygen, will be the 1-oxygen of the cyclic ether. The ketone or acyl fluoride carbonyl carbon will be the 2-carbon of the oxetane ring. Hence, the substituents on this 2-carbon will be those pendent thereupon in the structure of the ketone or acyl fluoride reactants. Thus, in the case of the ketone reactants, the 2-carbon will carry two monovalent perfluoro- or omega-hydroperfluorocarbyl radicals or one divalent perfluorocarbyl radical, which together with ketone carbonyl form the entire perfluoro- or omega-hydroperfluoroketone molecule. In the case of the perfluoro- and omega-hydroperfluoroacyl fluoride reactants, the 2-carbon of the polyfluorooxetanes therefrom will in every instance carry one fluorine substituent with the remaining valence satisfied by a monovalent perfluoro- or omega-hydroperfluorocarbyl radical which with the carbacyl fluoride group forms the entire molecule of the perfluoro- or omega-hydroperfluorocarbacyl fluoride reactant. The olefinic carbons, i.e., the carbons doubly bonded to each other in the polyfluoroolefin reactant, will be the 3- and 4-carbons in the final polyfluorooxetanes, and, accordingly, the substituents thereon in the olefin will be the substituents on the 3- and 4-carbons, respectively, in the polyfluorooxetane. In the case of the preferred olefin reactants, i.e., the 1,1,2-trifluoroolefins, i.e., the perfluoro- and omega-hydroperfluoro terminal olefins, the perfluoro- or omega-hydroperfluorocarbyl radical pendent on the 2-carbon of the 1,1,2-trifluoroolefins will be the substituent on the 3-carbon of the polyfluorooxetanes, and the remaining valence of the 3-carbon and both valences of the 4-carbon will be satisfied by fluorine atoms.

From the foregoing it is apparent that there can be used any wholly carbon chain perfluoro- and omega-hydroperfluoroketone or acyl fluoride, generally of no more than twelve carbons in each perfluoro- or omega-hydroperfluorocarbyl radical pendent on carbonyl carbon. Particularly outstanding because of the readier availability thereof are such ketones and acyl fluorides which are aliphatic in character, i.e., the aliphatic and cycloaliphatic ketones and carbacyl fluorides. Suitable specific illustrations of these polyfluoroketones and carbacyl fluorides in addition to those given in the foregoing examples include perfluoroacyclic ketones such as perfluoroacetone, perfluoro- 13-pentacosanone, i.e., pentacontafluoro - 13 - pentacosanone; perfluorocyclic ketones such as perfluorocyclopentanone; omega-hydroperfluoroketones such as bis(omega-hydroperfluoroethyl)ketone, i.e., 1H, 5H-octafluoro-3-pentanone, bis(omega-hydroperfluorododecyl)ketone, i.e., 1H, 25H-octatetracontafluoro-13-pentacosanone; perfluoroacyl fluorides such as trifluoroacetyl fluoride, perfluorotridecanoyl fluoride; omega-hydroperfluorocarbacyl fluorides such as difluoroacetyl fluoride, omega-hydroperfluorotridecanoyl fluoride, i.e., 13H-tetracosafluorotridecanoyl fluoride; and the like.

Certain of the aforesaid polyfluoroketone reactants, in particular the omega-hydroperfluoroketones, are new compositions of matter per se, which are disclosed and claimed in the copending application of Simmons U.S. S.N. 730,281, filed April 23, 1958, now Patent 3,029,252. In addition to the preparative method of that application, these new omega-hydroperfluoroketones can be prepared by the reaction of an alkali metal alkoxide on the hydrocarbyl esters of the requisite omega-hydroperfluorocarboxylic acid, as disclosed and claimed in greater detail in the copending application of Wiley U.S. S.N. 730,266, filed April 23, 1958, now Patent 3,091,643.

As is apparent from the foregoing, the material to be reacted with the aforesaid described polyfluoroketones and acyl fluorides are the 1,2-difluoroolefins of at least three chain carbons, wherein the remaining single valences of the 1- and 2-carbons are satisfied by direct and single linkage to halogen, especially fluorine, omega-hydroperfluorocarbyl, or perfluorocarbyl radicals, the last of which may be together joined to form a cyclic polyfluoroolefin of from four to seven ring members. Generally the acyclic olefins are preferred because of readier availability and greater reactivity. Suitable additional specific illustrations of these polyfluoroolefins include the perfluorocarbon olefins, straight chain in nature, such as perfluoropentene-1, perfluorohexene-1, decene-1, all of which contain terminal carbon-carbon ethylenic unsaturation; the acyclic wholly carbon chain perfluoroolefins containing internal carbon-carbon unsaturation, such as perfluorobutene-2 and perfluorohexene-3; the cyclic perfluoroolefins, in particular the perfluoromonoolefins, such as perfluorocyclohexene; the wholly carbon chain acyclic omega-hydroperfluoroolefins, such as omega-hydroperfluorobutene-1, omega-hydroperfluorohexene-1, omega-hydroperfluorooctene-1, omega-hydroperfluorodecene-1, omega-hydroperfluorododecene-1, and the like. The carbon chain of the perfluoro- and omega-hydroperfluoroolefins will generally not exceed 12, and preferably 10, carbons. The substituents on the ethylenic carbons become the substituents on the 3- and/or 4-carbon of the new polyfluorooxetanes, and accordingly the carbon chains of the radicals pendent on these 3- and 4-ring carbons will generally not exceed a total of 10 and preferably 8 carbons each.

As illustrated in the foregoing, the new polyfluorooxetanes of this invention can be prepared by the direct reaction between the aforesaid classes of polyfluoroketones and carbacyl fluorides with the polyfluoroolefins in the presence of actinic light. Any source of such radiation can be used. Because of improved reaction efficiency sources relatively high in UV output are preferred. Generally speaking, the mercury vapor arc lamps will be used since they afford a relatively intense source of the preferred UV light. A wide variety of such lamps are available on the market, and any or all can be used, including both low and high pressure lamps with various types of glass envelopes, the most preferred of which are those with quartz envelopes since the highest percent transmission of UV is achieved thereby.

The reaction can be effected properly in the presence or absence of an inert organic reaction medium which, if present, should be anhydrous. Any inert liquid organic diluent can be used and generally speaking the most common are the normally liquid hydrocarbons polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoraliphatic hydrocarbons, e.g., 1,1,2,2,-tetrafluoro-3,3-dimethylbutane, and the like; the polyfluoroaliphatic/cycloaliphatic hydrocarbons, e.g., perfluorodimethylcyclohexane, and the like. The choice of the particular diluent is not at all critical and will vary with such other normal variables as the reaction temperature found necessary. In most instances, in order to simplify the reaction, no diluent is used. The requisite polyfluoroketone or acyl fluoride and polyfluoroolefin are mixed, irradiated with ultraviolet light for the necessary reaction time, and the products simply isolated by direct precision fractionation of the reaction mixture. The absence of a diluent generally makes the separation easier.

The condensation can be carried out at temperatures ranging from below 0° C. to generally no higher than 150° to 200° C., varying with the relative reactivity and the physical properties of the polyfluoroketone or acyl fluoride and polyfluoroolefin reactants. Generally speaking, the higher temperature ranges will be avoided since operation under such conditions would usually require reaction equipment resistant to high pressures which is extremely difficult to fabricate from materials which would permit transmittal of the necessary radiation. Alternatively, the reaction would be carried out at higher temperatures under the requisite pressures with an internal source of ultra-violet irradiation in the reactor. However, such procedures are obviously not desirable and the reaction will generally be carried out in simple glass equipment at substantially room temperature, ranging up to whatever temperature is effected in the reaction zone due to thermal effects created by the radiation source. Practically speaking, since many of the shorter chain polyfluoroolefins are low boiling, the reaction zone will be maintained in the liquid condition through a reflux condenser to trap the olefin, generally using solid carbon dioxide/acetone as a cooling medium. The pressure at which the reaction is carried out is largely immaterial and will vary as will be apparent to those skilled in the art with the specific nature of the reactants and the operating temperature being used. Obviously for convenience, the reaction is preferably carried out in glass equipment at substantially atmospheric pressure or at pressures no greater than two to five atmospheres.

Suitable further specific illustrations of the new polyfluorooxetanes of this invention, in addition to those given in detail in the foregoing examples, can be obtained by reacting the polyfluoroketones or polyfluorocarbacyl fluorides with the necessary polyfluoroolefins, all in the manner set forth in detail above. Thus, from perfluoroacetone and perfluoro-1-decene there will be obtained 3,4,4-trifluoro-2,2-bis(trifluoromethyl)- 3 -perfluoroctyloxetane; from pentacontafluoro-13-pentacosanone and perfluoro-1-pentene there will be obtained 2,2-bis(pentacosafluorododecyl)-3,4,4-trifluoro-3-heptafluoropropyloxetane; from perfluorocyclopentanone and perfluoro-1-hexene there will be obtained 3-nonafluoro-n-butyl-2,2,3,5,5,6,6,7,7,8,8-undecafluoro-1-oxaspiro[3.47] octane; from 1H, 5H-octafluoro-3-pentanone and perfluoro-2-butene there will be obtained 3,4-difluoro-2,2-bis(2H-tetrafluoroethyl)-3,4-bis(trifluoromethyl)oxetane; from 1H,25H-octatetracontafluoro-13-pentacosanone and perfluoro - 3 - hexene there will be obtained 3,4-difluoro-2,2-bis(12H-tetracosafluorododecyl)-3,4-bis(perfluoroethyl)oxetane; from trifluoroacetyl fluoride and perfluorocyclohexene there will be obtained 1,1,2,3,3,4,4,5,5,6,8-undecafluoro-8-trifluoromethyl-7-oxabicyclo[4.2.0] octane; from pentacosafluorotridecanoyl fluoride and 3H-pentafluoropropene there will be obtained 2-pentacosafluoro-n-dodecyl)-2,3,4,4-tetrafluoro-3-difluoromethyloxetane; from difluoroacetyl fluoride and 4H-heptafluoro-1-butene there will be obtained 3-(2H-tetrafluoroethyl) - 2,3,4,4 - tetrafluoro - 2 - difluoromethyloxetane; from 13H-tetracosafluorotridecanoyl fluoride and 12H-tricosafluoro-1-dodecene there will be obtained 3-(10H-cosafluoro-n-decyl)-2-(12H-tetracosafluoro-n-dodecyl)-2,3,4,4,-tetrafluorooxetane.

The new polyfluorooxetanes of this invention range from clear, colorless liquids to low melting solids, depending generally on the total number of carbons in the molecule. Those containing less than about 18 carbons, which are the most common, are clear, colorless liquids boiling normally from 100–300° C. They exhibit high hydrolytic stability, both under aqueous acid and aqueous base conditions. They are soluble in alkanols, ethers, and various perfluorocarbon solvents, but insoluble in water and solutions containing high percentages of water. They also exhibit outstanding resistance against thermal and oxidative degradation and are, in fact, nonflammable. These compounds are thus useful as "stable liquid" materials, e.g., as transformer fluids, fluids for high temperature power transmissions, or hydraulic systems, or liquid-coupled mechanical drives.

In addition to these properties these 2,3-bis-perfluorocarbyl or omega-hydroperfluorocarbyl polyfluorooxetanes are generically useful as solvents for highly fluorinated polymers, e.g. the fluorinated olefin polymers. Solutions of such polymers, e.g. polytetrafluoroethylene, polytrichloroethylene and the like, in the polyfluorooxetanes are useful in rendering waterproof such cellulose shaped objects as paper, wood and the like as well as in forming films and fibers and other shaped objects of the polymers.

EXAMPLE A

*Use of the 2,3-Bis(Polyfluorocarbyl)3,4-Difluoroxetanes as Solvents*

A 14.3% by weight solution of a low molecular weight, low melting tetrafluoroethylene polymer (melting range 83–150° C.) was prepared by heating 1.38 parts of the polymer in 8.3 parts of 2-(4H-octafluoro-n-butyl)-2,3,4,4-tetrafluoro-3-trifluoromethyloxetane—see Example III. Near the boiling point of the oxetane (about 114° C. at atmospheric pressure) the solution was a clear, liquid, single phase. On cooling to room temperature the solution rapidly set up to a stiff, opaque gel plug of the tetrafluoroethylene polymer plasticized with the oxetane.

Strips of filter paper (Grade E and D 615) were partly immersed for 0.5 to 1.0 minute in the polymer solution heated just below the boiling point of the oxetane. The strips were then removed from the hot solution and hung up in the air to allow the solvent to evaporate. Upon subjection to a stream of water, the treated areas of the filter were not wet by the water at all. In contrast the untreated areas of the filter paper were immediately and completely wet. The treated areas of the filter paper were thus rendered waterproof.

Small, cylindrical, wooden sticks were also partly immersed in the hot polymer solution for periods of about two minutes. After removal from the hot solution and air-drying to remove the solvent, the parts of the sticks which had been impregnated with the polymer solution shed water and were not at all wet by it. In contrast the untreated areas of the wooden sticks rapidly absorbed water and were noticeably swollen thereby. The treated wood remained dimensionally stable in water.

A 10.2% solution of the same low melting tetrafluoroethylene polymer was prepared by heating 0.40 part of the polymer in 3.54 parts of 3,4,4-trifluoro-3-trifluoromethyl-2,2-bis-(perfluoropropyl)oxetane—see Example V. Near the boiling point of the fluorooxetane at about 130° C at atmospheric pressure the solution was a clear, liquid, single phase. On cooling to room temperature the solution rapidly set up to a stiff, thick, opaque, gel plug of the polymer plasticized with the oxetane. Upon partial immersion of samples of filter paper and wooden sticks in the hot polymer solution as outlined above, subsequent withdrawal and air-drying to remove the solvent the same results as above were obtained, viz., the areas of the filter paper and the wooden sticks which had been immersed in the polymer solution had become waterproof by virtue of the deposition thereon of the polytetrafluoroethylene. Water did not wet the treated areas of both the filter paper and the sticks, and the sticks treated were dimensionally stable in water.

We claim:

1. A compound having the skeletal structure

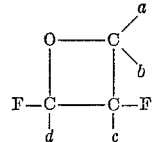

wherein each of bonds *a*, *b*, *c*, and *d* is satisfied by a member of the group consisting of F, perfluoroalkyl of 1 to 10 carbons inclusive, omega-hydroperfluoroalkyl of 1 to 10 carbons inclusive, perfluoroalkylene forming with carbon directly attached through bonds *a* and *b*, a carbocyclic ring of 4 to 7 carbons inclusive, and perfluoroalkylene forming with carbons directly attached through bonds *c* and *d*, a carbocyclic ring of 4 to 7 carbons inclusive, with the proviso that each of bond *c*, and at least one of bonds *a* and *b*, is satisfied by a member of said group other than F.

2. A 2,3-bis-(perfluoroalkyl)-perfluorooxetane, said fluoroalkyls each being of 1 to 10 carbons inclusive.

3. 2-perfluoroheptyl - 3 - perfluoromethyl perfluorooxetane.

4. A 2-(omega-hydroperfluoroalkyl) - 3 -perfluoroalkyl-perfluorooxetane, each of said fluoroalkyls being of 1 to 10 carbons inclusive.

5. 2-(omega-hydroperfluorobutyl) - 3 -perfluoromethyl-perfluorooxetane.

6. A 3-(perfluoroalkyl-2,2 - bis - (perfluoroalkyl) - perfluorooxetane, each of said fluoroalkyls being of 1 to 10 carbons inclusive.

7. 3-perfluoropentyl - 2,2 - bis - (perfluoropropyl) - perfluorooxetane.

8. 3-perfluoromethyl-2,2 - bis - (perfluoropropyl) - perfluorooxetane.

9. A 3-perfluoroalkyl-1-oxaspiro[3.3] perfluoroheptane, said fluoroalkyl being of 1 to 10 carbons inclusive.

10. 3-perfluoromethyl - 1 - oxaspiro [3.3] perfluoroheptane.

11. A 3-(omega-hydrofluoroalkyl)-2-perfluoroalkylperfluorooxetane, each of said fluoroalkyls being of 1 to 10 carbons inclusive.

12. 3-(beta-hydroperfluoroethyl)-2-perfluoropropylperfluorooxetane.

References Cited in the file of this patent

UNITED STATES PATENTS 2,594,272    Kauck et al.             Apr. 29, 1952

FOREIGN PATENTS 672,720    Great Britain             May 28, 1952
718,318    Great Britain             Nov. 10, 1954

OTHER REFERENCES

Richter's Organic Chemistry, volume IV, page 4 (1947).